INVENTOR.
BOYD C. BLAIR
BY
Fishburn, Gold & Litman
ATTORNEYS

United States Patent Office 3,560,311
Patented Feb. 2, 1971

3,560,311
METHOD AND MACHINE FOR MAKING TABLETS
Boyd C. Blair, Topeka, Kans., assignor to Brackett Stripping Machine Co., Inc., Topeka, Kans., a corporation of Kansas
Filed Jan. 15, 1968, Ser. No. 697,685
Int. Cl. B42c *13/00*
U.S. Cl. 156—557                        7 Claims

ABSTRACT OF THE DISCLOSURE

A method and apparatus for making tablets with the method including arranging a plurality of sheets into a set, registering edges of the sheets in the set, holding the set in a pressed together condition, grinding one edge of the set and applying a hardenable quick drying adhesive to the one edge of the set, said method including maintaining the edges of the set in registry during grinding the one edge and applying adhesive thereto, said method including applying a strip having adhesive to the one edge, folding opposite margins of the strip to engage exterior sheets, and cutting the strip adjacent opposite ends of the one edge.

The apparatus for making the tablets having structure forming a defined path and a pair of cooperating endless belts, each having spaced endless thickened portions on the interior face thereof, means for receiving separate sheets arranged in a set, and means for holding said set between the endless belts and for moving the set along the defined path. The apparatus is adapted to move the set of sheets along the defined path to a grinder adjustable to trim one edge of the set and to an adhesive applying position where a wheel receiving adhesive from a container and applies same to the one edge. The apparatus includes a plurality of spaced guide rollers which are complementary to and adapted to engage the interior face of each endless belt and endless thickened portions thereon with one group of the guide rollers being mounted in adjustable rail sections. The adjustable rail sections are divided into segments and are resiliently mounted whereby the set of sheets is held in a selected position and the sheets in the set are maintained in registry. A plurality of tensioning rollers are associated with each endless belt to maintain a desired tension in the respective endless belts.

The principal objects of the present invention are: to provide a tablet making machine which arranges single sheets in sets and forms tablets in a single operation; to provide a tablet making machine tablets in a single operation; to provide a tablet making machine that moves sets of sheets in a defined path while holding the sets in a suitable position during grinding of one edge and adhesive application to the ground edge for securing the sheets in separable relation; to provide a tablet making machine having a cutter for trimming one edge of the sets as moved thereover, and an adhesive container and wheel for applying adhesive to said one edge of the sets; to provide such a tablet making machine with a stripping applicator for applying a strip having adhesive on one face to said one edge of the sets and folding the opposite margins of the strip to engage a portion of exterior sheets, and a cutter adapted to cut the strip adjacent opposite ends of said one edge of the sets; to provide a pair of novel cooperating spaced apart endless belts having a pair of endless wedge-shaped portions mounted on an interior face of each endless belt; to provide a plurality of novel guide rollers engaging the interior face of the respective endless belts and with one group of the guide rollers being mounted in the rail sections which are adjustably and resiliently mounted; to provide a center roller and a pair of tensioning rollers adjustably mounted and associated with each endless belt, said center roller and said pair of tensioning rollers being adapted to adjust and to maintain a desired tension in each of the respective endless belts; to provide a method for manufacturing tablets by arranging a plurality of sheets into sets, registering edges of the sheets in the sets, holding the sets in a compressed condition, trimming one edge of the sets to an even edge, applying a hardenable flowable quick drying adhesive to the one edge; to provide such a method which includes applying a strip having adhesive to the one edge, folding opposite margins of the strip to engage a portion of the exterior sheets of the sets, and cutting the strip between the sets; to provide a method of forming tablets wherein the sets are held vertically and moved in the defined path, and creeping and crawling of the interior sheets is prevented; and to provide a method and a machine for making tablets wherein the structure is adapted for high speed operations and the tablets are economically produced with the sheets positively held in the assembled condition.

Other objects and advantages of this invention will become apparent from the following description taken in connection with the accompanying drawings wherein are set forth by way of illustration and example certain embodiments of this invention.

Referring more in detail to the drawings:

The reference numeral 1 generally designates a tablet making machine for manufacturing tablets 2 by holding a plurality of separate sheets 3 in a suitable position preferably while moving the sheets 3 along a defined path 4 between a pair of gripping members such as cooperating endless belts 5.

Figures 3, 5, 10:
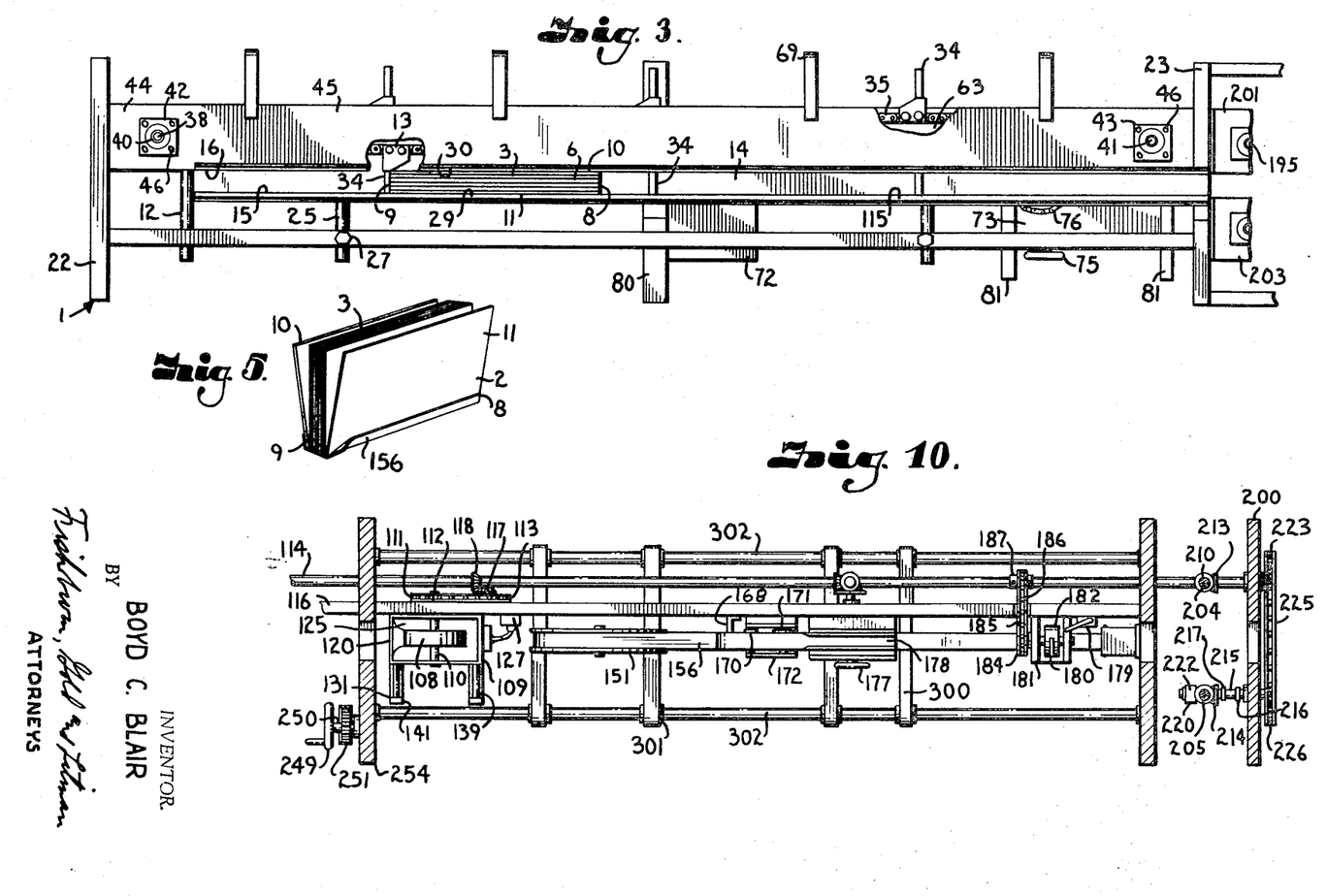
FIG. 3 is a partial plan view of the portion of the machine shown in FIG. 1.
FIG. 5 is a perspective view of a set of sheets formed into a tablet.
FIG. 10 is a horizontal partial sectional view through the machine taken on line 10—10, FIG. 2.

The sheets 3 are arranged into a set 6 and suitably inserted into the machine 1 in a manner whereby corresponding edges 7 of sheets 3 in the set 6 are substantially registered. In the illustrated arrangement the sets 6 are positioned vertically in the machine 1 so as to have a leading edge 8 and a trailing edge 9 with the edges 7 at the bottom and extending therebetween. Each of the sets 6 has a plurality of the sheets 3 between a pair of exterior sheets 10 and 11. The exterior sheet 10 may be similar or identical to the interior sheets 3 or it may be of a different material such as cardboard with the outer sheet of a distinctive cover material for the other exterior sheet.

Each of the sets 6 is inserted into the machine 1 adjacent a suitable end member such as an elongate rod or bar 12 which is positioned adjacent a moving mechanism 13 and the bash 12 forms one end of a defined path 14. The defined path 14 communicates with and is aligned with the defined path 4 between the endless belts 5.

A pair of elongate parallel upper guide members such as plates 15 and 16 and a lower guide member 17 form the defined path 14 between the rod 12 and the defined path 4. One of the upper guide plates, as for example plate 16, and the lower guide member 17 are adjustable laterally to vary the width of the defined path 14. The bottom edge 7 of the sets 6 engages the lower guide member 17 and thereby registers the bottom edges 7 of the sheets 3. The lower guide member 17 is illustrated as an elongate angle having a horizontal leg 18 and an upstanding leg 19. In the illustrated structure the upper guide plate 16 and the upstanding leg 19 are alignable vertically to form one side of the defined path 14.

A pair of elongate bars 20 and 21 are spaced-apart vertically and are parallel to the plate 16 and the upstanding leg 19 of the defined path 14. The bars 20 and 21 extend the full length of the defined path 14 and are suitably secured to the machine 1 as by welding to an end wall or support 22 adjacent the rod or bar 12 and to an intermediate wall 23 adjacent the point of communication between the defined path 14 and the endless belts 5.

The width of the defined path 14 is adjustable to conform to the thickness of the sets 6. A plurality of bores 24 in each of the bars 20 and 21 are aligned with the plate 16 and the upstanding leg 19 and are each adapted to receive an elongate cylindrical shaft 25. As an annular flange 26 is suitably secured on one end of each shaft 25 as by welding and the annular flange 26 is suitably secured to the upper guide plate 16 or the lower guide member 17. Each of the shafts 25 is movable in the respective bore 24 to adjust the width of the defined path 14 and a suitable adjustable fastening device such as a screw 27 is mounted in the bars 20 and 21 so as to engage each of the shafts 25 and retain same in selected positions.

The lateral space between the upper guide plates and 15 is adjustable to conform to the thickness of the set 6. An upper portion 28 of the defined path 14 is flared outwardly to receive the sets 6 therein. The upper portion 28 is formed by offset portions 29 and 30 of the upper guide plates 15 and 16 respectively being flared upwardly and outwardly of the defined path 14.

The lower guide member 17 is supported at its opposite ends by suitable support members mounted on the end wall 22 and the intermediate wall 23 respectively. In the illustrated structure, the support members are angles 31 suitably secured to the end and intermediate walls 22 and 23 respectively, as by bolts 32. The horizontal leg 18 slides on an outstanding leg 33 of each angle 31 during lateral adjustment of the upstanding leg 19 to align vertically with the upper guide plate 16.

The moving mechanism 13 transfers the set 6 from adjacent the rod or bar 12 to the point of communication between the defined path 14 and the endless belts 5. One of a plurality of moving lugs 34 engages the trailing edge 9 of the set 6 and registers the trailing edge 9 of the sheets 3, 10, and 11 as the set 6 is moved along the defined path 14. The moving lugs 34 are arranged at predetermined spaced intervals along an endless chain 35 and secured thereto as later described.

The endless chain 35 operates around a drive sprocket 36 and around an idler sprocket 37 and in the illustrated structure, moves in a generally horizontal plane parallel to the defined path 14 and slightly above and to one side of the horizontal leg 18. In the illustrated structure, the drive sprocket 36 is adjacent the point of communication between the defined path 14 and the endless belts 5 and the idler sprocket 37 is adjacent the rod or bar 12. A drive shaft 38 supports the drive sprocket 36 and an idler shaft 39 supports the idler sprocket 37.

In the illustrated structure the drive shaft 38 and the idler shaft 39 are radially and vertically supported adjacent their upper ends 40 and 41 respectively by a suitable bearing and support such as pillow blocks 42 and 43 respectively. The pillow blocks 42 and 43 are suitably secured to an upper face 44 of an upper lug guide 45, as by suitable screws or bolts 46. Suitable bearings 47 radially support the shafts 38 and 39 intermediate their ends and engage a lower face 48 of the upper lug guide 45.

Figures 4, 11, 12, 13:
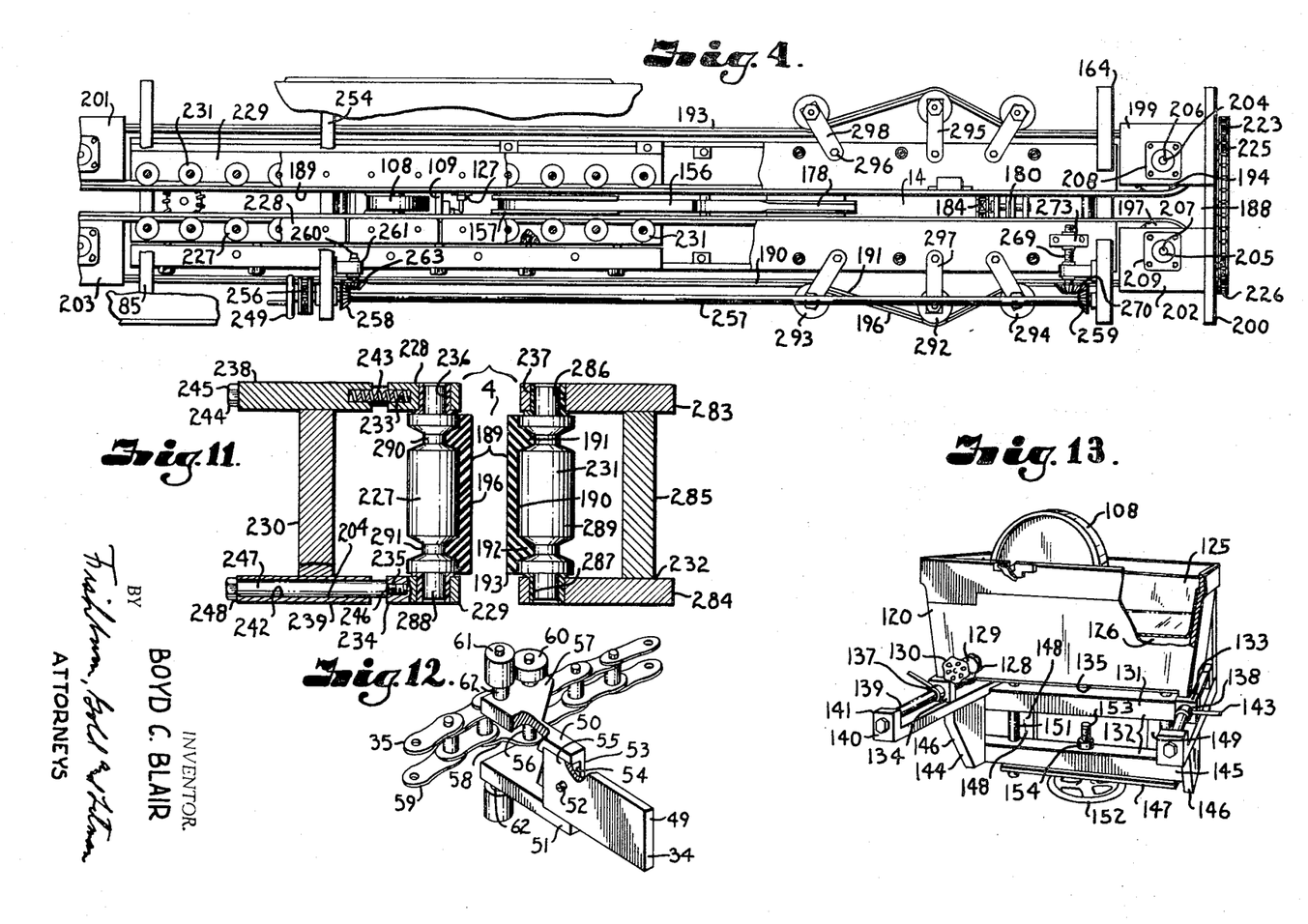
FIG. 4 is a partial plan view of the remaining portion of the machine shown in FIG. 2.
FIG. 11 is an enlarged fragmentary sectional view of the mounting of the guide rollers and the rail sections.
FIG. 12 is a partial perspective view of a moving lug and chain.
FIG. 13 is an enlarged perspective view of the adhesive container and adhesive applying wheel.

The moving lugs 34 each includes an upright elongate blade 49 which extends outwardly from and is suitably secured to a pair of arms 50 and 51 preferably vertically spaced-apart, as by a set screw 52 engaging an upright plate 53 extending vertically between and connecting the arms 50 and 51. The blade 49 is a planar member and is also mounted in a recess 54 in each of the arms 50 and 51 in one end 55 thereof. An elongate rod 56 extends vertically through the arms 50 and 51 in an enlarged portion of an other end 57 thereof and the rod 56 is mounted in a lug 58 of selected chain links 59. A pair of guide rollers 60 are carried on opposite ends of the rod 56. A pair of lug positioning rollers 61 are individually installed on a pair of vertically extending stub shafts 62 which are secured on the arms 50 and 51 respectively and the pair of rollers 61 are substantially in line with the blade 49 as shown in FIG. 12.

Figure 6:
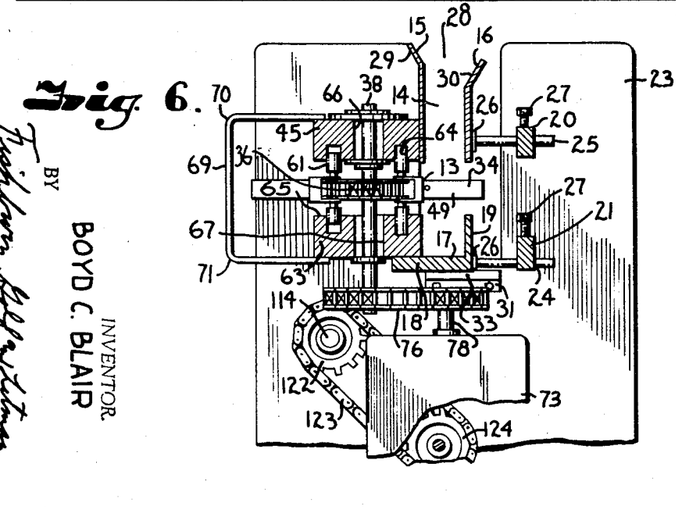
FIG. 6 is a partial vertical sectional view through the machine taken on line 6—6, FIG. 1.

In the illustrated structure the upper lug guide 45 and a lower lug guide 63 are vertically spaced-apart elongate plates extending between and suitably secured to the end wall 22 and the intermediate wall 23 and are parallel to the pair of elongate bars 20 and 21. A recess 64 in facing surfaces of each of the lug guides 45 and 63 defines a path to guide the pair of guide rollers 60 and guide the pair of positioning rollers 61 as the endless chain 35 travels around the sprockets 36 and 37. The recesses 64 are in opposed relation in the lower face 48 of the upper lug guide 45 and in an upper face 65 of the lower lug guide 63 respectively as shown in FIG. 6. Aligned bores 66 and 67 extend through the lug guides 45 and 63 respectively adjacent the intermediate wall 23 to receive the drive shaft 38. The idler shaft 39 is received in a similar bore (not shown) in the upper lug guide 45 adjacent the end wall. In the illustrated structure the guide plate 15 is suitably secured to the upper lug guide 45 to form a fixed side of the defined path 14.

A plurality of guards 69 are installed on the lug guides 45 and 63 to protect the moving lugs 34 and to prevent injuries to operating personnel. In the illustrated structure the guards 69 are elongate bars having two right angle bends 70 and 71 intermediate their ends which are suitably secured to the lug guides 45 and 63 respectively on a side opposite the defined path 13.

A speed regulator 72 coordinates the speed of the endless chain 35 and the moving lugs 34 thereon relative to the speed of the endless belts 5. The speed regulator 72 is electrically connected to a motor 73 by an electric conduit 74. A suitable control such as handwheel 75 varies the speed of the motor 73. A suitable power transmission means is operative to rotate the drive shaft 38 thereby driving the endless chain 35 and the moving lugs 34. In the illustrated structure, an endless drive chain 76 engages a first sprocket 77 installed on a stub drive shaft 78 which is operatively connected to the motor 73 and a second sprocket 79 on the drive shaft 38 adjacent the lower lug guide 63.

In the illustrated structure, the speed regulator 72 is supported on a suitable support 80 and the motor 73 and control 75 are supported by a pair of stub walls 81. The stub walls 81 are positioned adjacent the intermediate wall 23.

A suitable abutment member such as a roller or rod 82 extends vertically between the upper and lower lug guides 45 and 63 and is positioned to be engaged by the blade 49 substantially at the same time as the leading edge 8 of the respective set 6 is engaged by the endless belts 5. The roller or rod 82 effects disengagement of the respective blade 49 with the trailing edge 9 of the set 6 simultaneously as the leading edge 8 is engaged by the pair of endless belts 5 for continued forward movement in the machine 1.

Figure 7:
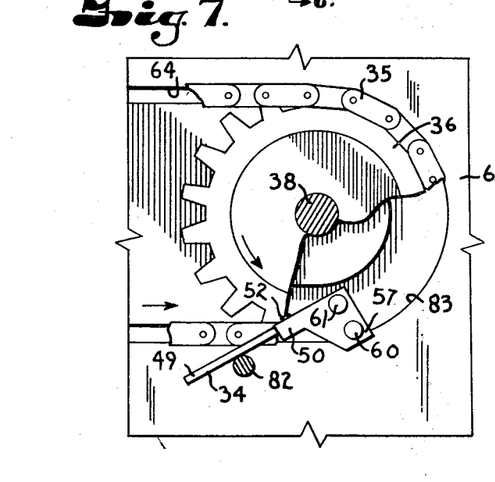
FIG. 7 is an enlarged horizontal partial sectional view of the driving sprocket and a moving lug with portions broken away to show the path taken by the lugs around the driving sprocket.

The recesses 64 are enlarged adjacent the drive shaft 38 thereby removing support for the upper and lower positioning rollers 61 thereby allowing the blade 49 to be retracted until the blade 49 is beyond the drive shaft 38 as shown in FIG 7. The pair of guide rollers 60 continues engagement with one wall 83 of the respective recesses 64. A similar roller or rod and recess enlargement may be installed adjacent the idler shaft 37 to retract the blades 49 to clear the end wall 20.

The pair of endless belts 5 cooperate to receive and hold the sets 6 in precise registry during processing of each of the sets 6 to form the respective tablets 2. The bottom edge 7 of the sets 6 are first engaged by a rotary grinder 84 which is adapted to trim the bottom edge 7 in preparation for the application of a suitable adhesive, such as a hardenable flowable quick drying adhesive.

Figure 9:
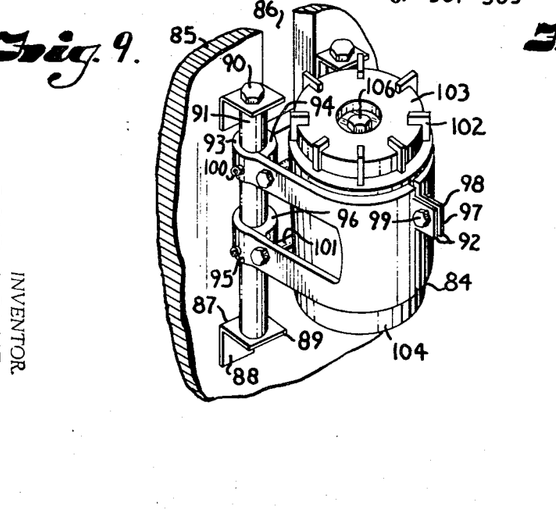
FIG. 9 is an enlarged perspective view of a rotary grinder employed in the machine.

The grinder 84 is supported on a support wall 85 which has an opening 86 allowing the sets 6 to pass therethrough as best shown in FIG. 9. In the illustrated structure suitable supports, such as mounting angles 87, is suitably secured to the support wall 85 and the other leg 89 extends outwardly therefrom and has a suitable bore (not shown) to receive an elongate bolt 90. A cylindrical tubular sleeve or rod 91 extends vertically between each pair of angles 87 and engages the outstanding other leg 89 thereof. Each rod 91 is secured in position by the respective bolt 90 being inserted in the rod 91 and engaging the respective outstanding other legs 89.

A pair of strap brackets 92 are installed on each of the rods 91 and the brackets 92 are shaped to engage and secure the grinder 84 in a selected position relative to the bottom edge 7. One end 93 of each strap bracket 92 is bifurcated forming a pair of arms 94 and 95 upper and lower respectively. The arms 94 and 95 each have an eyelet or loop 96 which is complimentary to the rod 91. The other end 97 of each strap bracket 92 has an outstanding ear 98. A suitable fastening device, such as a bolt 99, extends through the ears 98 of each of the strap brackets 92 and clamps the ears 98 together thereby securing the grinder 84 within the pair of strap brackets 92. The grinder 84 is adjustable relative to the edge 7 of the sets 6 and in the illustrated structure a suitable fastening device, such as a set screw 100 is installed in each eyelet 96 and engages the respective sleeve or rod 91 thereby securing the grinder 84 in a selected vertical position. Additional clamping engagement on the grinder 84 by the brackets 92 is produced by a clamping bolt 101 being installed between each of the upper arms 94 and between each of the lower arms 95. In the illustrated structure one bolt 101 extends between opposite upper arms 94 and another bolt 101 extends between opposite lower arms 95 of the pair of strap brackets 92.

The grinder 84 has a plurality of grinding blades 102 installed in spaced radial relation around the periphery of a grinding head 103. The blades 102 extend above the grinding head 103 and engage the bottom edge 7 of the sets 6 during movement through the opening 86. A suitable motor 104 electrically controlled from a power source 105 is operatively connected to the grinding head 103 to rotate same about a shaft 106. The blades 102 grind or trim the bottom edge 7 of the sets 6 to an even surface and it is preferable to slightly roughen the bottom edge 7 in preparation for the application of adhesive. A suitable vacuum unit 107 is mounted adjacent the grinding head 103 to remove debris produced by the grinding of the sets 6.

The bottom edge 7 is thereby prepared for the application of adhesive and is next engaged by an adhesive wheel 108 mounted in an adhesive applicator 109. The wheel 108 applies a suitable hardenable flowable quick drying adhesive thereto. The adhesive wheel 108 is suitably supported on and secured to a shaft 110 having a sprocket 111 installed adjacent one end thereof.

Figure 8:
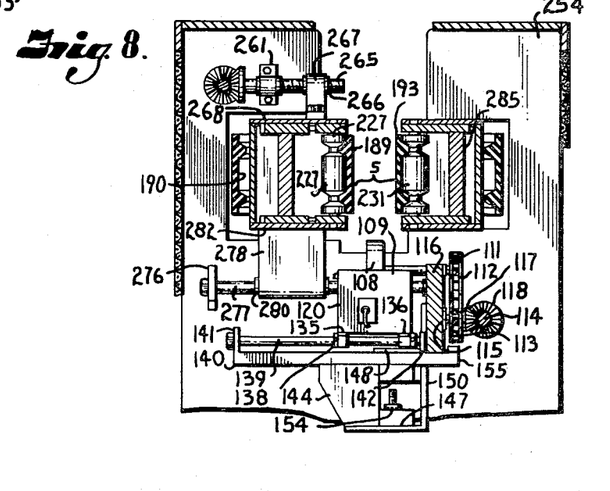
FIG. 8 is a partial vertical sectional view through the machine taken on line 8—8, FIG. 2.

As best seen in FIGS. 8 and 10 a suitable power transmission means, such as an endless chain 112, engages the sprocket 111 and a sprocket 113 which is driven in response to an elongate drive shaft 114 which is operatively connected to the motor 73 as later described. A stub shaft 115 has the sprocket 113 suitably secured thereon intermediate its ends and one end of the stub shaft 115 is supported by a suitable bearing mounted in or on an elongate beam 116. A miter gear 117 is secured on the other end of the stub shaft 115 and supported by a miter gear 118 which is suitably secured on the elongate drive shaft 114. Opposite ends of the adhesive wheel supporting shaft 110 are supported by suitable bearings (not shown) installed in an adhesive container 120.

Figure 1:
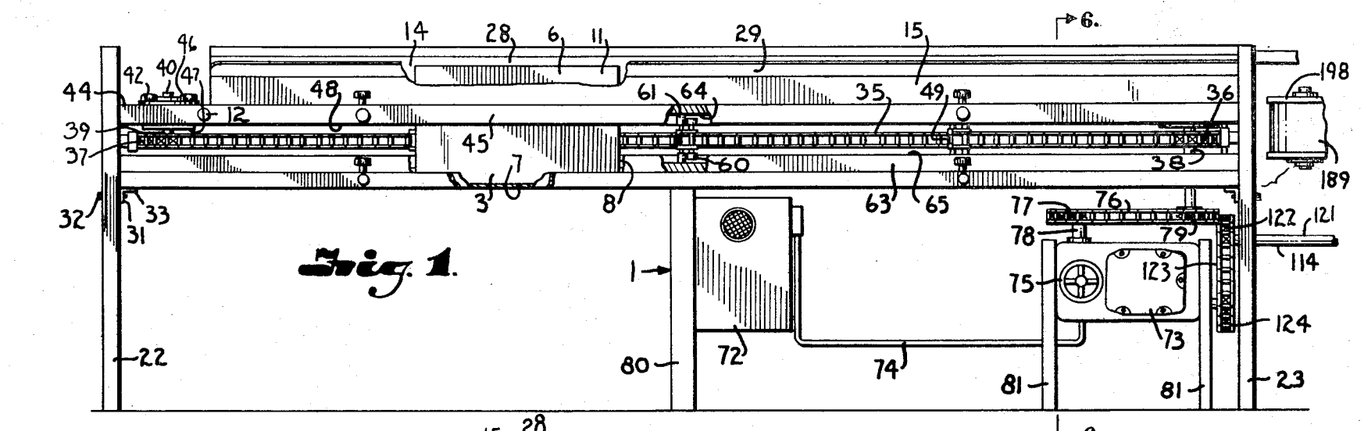
FIG. 1 is a partial side elevation of a portion of a tablet making machine embodying features of the present invention.
Figure 2:
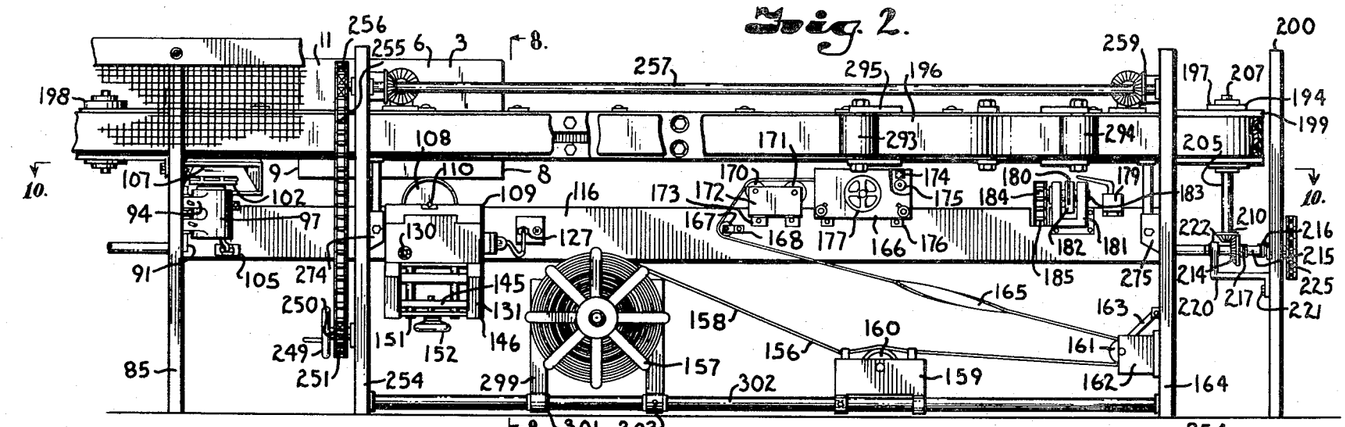
FIG. 2 is a partial side elevation of the remaining portion of the tablet making machine embodying features of the present invention.

The elongate drive shaft 114 is operatively connected to the motor 73 to drive the adhesive wheel 108 at a preselected speed. The speed of the adhesive wheel 108 corresponds to the speed of the endless belts 5 which carry the sets 6 therebetween. One end 121 of the elongate drive shaft 114 has a drive sprocket 122 suitably secured thereon adjacent the intermediate wall 23. A suitable power transmission means such as an endless chain 123 engages the drive sprocket 122 and a sprocket 124 driven directly by the motor 73 as best shown in FIGS. 1 and 6.

An upper compartment 125 of the container 120 holds a suitable quick drying adhesive which is hardenable and flowable. The container 120 is adapted to heat water or other suitable fluid in a lower compartment 126, thereby heating the adhesive by means of a suitable heating element (not shown) which is electrically controlled, as by an electrical connection 127. The upper or adhesive compartment 125 is removable, thereby exposing the lower or water compartment 126 which can then be filled with water or other suitable fluid. In the illustrated structure a stub pipe 128 is located adjacent the bottom of the lower or water compartment 126 to empty same. The stub pipe 128 has a suitable valve 129 to control the flow of water from compartment 126 and handwheel 130 operatively connected to the valve.

The adhesive applicator 109 is supported on a platform 131 which is movable transversely of the longitudinal axis of the machine 1 as best seen in FIGS. 8 and 13. In the illustrated structure the platform 131 consists of a pair of spaced horizontal bars 132 with depending end flanges 133 and 134 front and back, respectively, and a pair of brace members 135 and 136 extending between and suitably secured to the horizontal bars 132. The horizontal bars 132 are positioned transversely of the longitudinal axis of the machine 1. Tubular sleeves 137 and 138 front and back, respectively, are installed in each of the depending end flanges 133 and 134, respectively. The sleeves 137 and 138 are installed on a pair of elongate cylindrical rods 139 which are transverse to the longitudinal axis of the machine 1 and parallel to the bars 132. Each of the rods 139 is supported by one of a pair of arms 140 which are elongate planar members each having an upstanding end flange 141 supporting one end of the respective rod 139 and an upstanding ear 142 intermediate the ends of the arms 140. The upstanding ear 142 supports the other end of the respective rod 139.

The sleeves 137 and 138 are installed on the rods 139 thereby permitting the platform 131 to move along the rods 139 with the movement being transversely of the longitudinal axis of the machine 1. An adjustable fastening device, such as a screw 143, is installed in each of the front sleeves 137 with the screw 143 being adapted to engage the respective rod 139 to secure the platform 131 in a selected lateral position.

The arms 140 with the platform 131 thereon are movable vertically and are supported by and suitably secured to a frame 144. Vertically spaced apart bars 145 are parallel to the longitudinal axis of the machine 1 and have opposite ends suitably secured to a pair of longitudinally spaced plates 146. A bracket 147 is suitably secured to the beam 116 and supports the frame 144. The bracket 147 has a pair of vertically spaced-apart outstanding flanges 148 and 149 upper and lower, respectively, suitably secured to a vertical plate 150. A pair of spaced guide rods 151 extend vertically between the flanges 148 and 149 and the guide rods 151 are suitably secured to the respective flanges 148 and 149. The spaced guide rods 151 also extend through each of the vertically spaced-apart bars 145. A handwheel 152 having a threaded shaft 153 engaged in an internally threaded bearing 154 is operable to raise and lower the frame 144 and thereby the adhesive applicator 109 and the adhesive wheel 108. The bearing 154 is suitably secured to one of the bars 145, preferably the lower. Turning the handwheel 152 raises or lowers the bars 145 thereby raising or lowering the wheel 108. An upstanding end flange 155 on each of the arms 140 is on an end opposite to the end flange 141. The end flange 155 engages the beam 116 to assist in guiding the arms 140 while moving vertically. The adhesive applicator 109 and therefore the adhesive wheel 108 are adjustable vertically to vary the pressure applied to the bottom edge 7 of the sets 6 and to vary the amount of adhesive applied to the bottom edge 7.

Processing of the tablet 2 may be complete when the adhesive hardens, however, it may be desired to finish the bottom edge 7 with a strip or tape 156. The strip or tape 156 has opposite margins folded to engage portions of the exterior sheets 10 and 11.

A reel 157 supports a roll of the tape 156 which will become the strip 156 on the finished tablets 2 and which may be plain or have a suitable adhesive on one face 158. The tape 156 is fed from the reel 157 to an applicator 159 which applies a suitable adhesive, such as a quick drying glue to the face 158 or moistens an adhesive present on the face 158. The applicator 159 has a wheel 160 which is similiar to the wheel 108 and which engages the face 158.

In the illustrated structure the tape 156 is then fed around an idler roller 161 which rotates in a housing 162. An arm bracket 163 is installed on a wall or support 164 to support the roller 161 and housing 162. The roller 161 supports the tape 156 on a bias to maintain tension on and twist the tape 156 as at 165. The twist 165 is a half-turn which places the face 158 in a position to engage the bottom edge 7 of the sets 6 in a stripping applicator 166. An adjustable roller 167 receives the tape 156 from the idler roller 161 and guides same toward the applicator 166. The roller 167 is adjustably mounted on the beam 116 as in a suitable bracket 168. The tape 156 next engages a pair of strip guide rollers 170 and 171 which rotate in a housing 172 suitably supported on the beam 116 as by angle brackets 173. The rollers 170 and 171 smooth and guide the tape 156 into the stripping applicator 166. Opposite margins or edges of the tape 156 are folded upwardly by the stripping applicator 166 and the margins are pressed or wiped into firm contact with the exterior sheets 10 and 11 adjacent the bottom edge 7 by suitable wipers 174. The face 158 between the margins is pressed or wiped into firm contact with the bottom edge 7 of the sets 6 by a suitable edge wiper 175 thereby finishing the edge 7 of the sheets 3 and the exterior sheets 10 and 11.

The stripping applicator 166 is suitably supported on the beam 116 as by angle brackets 176. A handwheel 177 adjusts the width of an opening 178 through the stripping applicator 166 to conform to the thickness of the sets 6. The wipers 174 and the edge wiper 175 are operatively connected to the elongate drive shaft 114 as by suitable bevel gears and shafts as best illustrated in FIG. 10.

As the spaced sets 6 are moved through the machine 1, a suitable sensor or detector 179 detects the space between adjacent sets 6 and actuates a suitable clutch (not shown) to rotate a cutting blade 180 in a cutter 181 to cut the tape 156 between the adjacent sets 6. The cutting blade 180 is installed in the periphery of a wheel 182 which is suitably secured to a shaft 183. A suitable power transmission means associated with the elongate drive shaft 114 and the shaft 183 is operable to drive the cutting blade 180. In the illustrated structure, a sprocket 184 is secured on one end of the shaft 183 and the sprocket 184 is engaged by an endless chain 185. A sprocket 186 is secured on a sleeve 187 which is installed on and suitably secured to the elongate drive shaft 114 and the sprocket 186 is engaged by the endless chain 185 thereby rotating the cutting blade 180 upon activation by the detector 179. The separated sets 6 are thus formed into finished tablets 2 when the tape 156 is cut and the finished tables 2 are then moved by the endless belts 5 to a discharge point 188 to deposit said tablets on a suitable table or conveyor (not shown) for batching and packing for shipment.

Relative movement of the sheets 3 in the sets 6 is prevented by a clamping engagement exerted by the endless belts 5 and their supporting structure. In the illustrated structure each of the endless belts 5 has a smooth exterior face 189 and an interior face 190 having a pair of vertically spaced apart endless projections in the form of a pair of wedge-shaped belts 191 and 192 upper and lower, respectively, suitably secured thereon, as by vulcanizing. In the illustrated structure the endless wedge-shaped belts 191 and 192 are truncated equilateral triangles in cross section. One of the endless belts 5, as for example, a belt 193, is driven by a fixed drive pulley 194 and travels around a fixed idler pulley 195. The other of the endless belts 5, as for example, a belt 196, is adjustable laterally to establish the width of the defined path 4 between the belts 193 and 196 equal to the thickness of sets 6. The laterally adjustable belt 196 is driven by a drive pulley 197 and travels around an idler pulley 198 both of which are adjustable laterally. In the illustrated structure, the fixed drive pulley 194 is supported by a pair of brackets 199 suitably secured to end wall 200 and the fixed idler pulley 195 is supported by a pair of brackets 201 suitably secured to the support wall 85.

The drive pulley 197 is supported by a pair of brackets 202 having a suitable elongate slot (not shown) therein which is transverse to the longitudinal axis of the machine 1 and the brackets 202 are suitably secured to the end wall 200. The idler pulley 198 is supported by a pair of brackets 203 having a suitable elongate slot (not shown) parallel to the slot in the brackets 202 and the brackets 203 are suitably secured to the support wall 85.

The fixed drive pulley 194 and the drive pulley 197 are mounted on vertical shafts 205 and 205 respectively with each having an upper end 206 and 207 respectively which is supported radially and vertically by a suitable bearing and support, such as pillow blocks 208 and 209 respectively. The pillow block 208 is fixed on the bracket 199 and the pillow block 209 is adapted to be laterally adjustable in response to lateral movement of the drive pulley 197.

Each of the shafts 204 and 205 have bevel gear 210 suitably secured on their lower ends. A bevel gear 213 engages the bevel gear 210 on the shaft 204 and is suitably secured to the elongate drive shaft 114, thereby driving the fixed drive pulley 194. Another bevel gear 214 is secured to a stub drive shaft 215 having suitable universal joints 216 and 217 which permit the stub drive shaft 215 to have one end laterally fixed in the end wall 200 and to have the other end with the bevel gear 214 thereon movable laterally in response to lateral movement of the stub drive shaft 205. The other end extends beyond the other bevel gear 214 and is supported by a bracket 220. One end 221 of the bracket 220 is suitably secured on the end wall 200 and the other end 222 supports the other end of the stub drive shaft 215. The end 222 is adapted to permit lateral movement of the end of the stub drive shaft 215 in response to lateral movement of the shaft 205.

A suitable power transmission means connects the elongate drive shaft 114 to the stub drive shaft 215. In the illustrated structure, a sprocket 223 is suitably secured to another end of the elongate drive shaft 114 adjacent the end wall 200. An endless chain 225 engages the sprocket 223 and a sprocket 226 suitably secured to the fixed end of the stub drive shaft 215 thereby driving the drive pulley 197.

The laterally adjustable belt 196 engages one group of longitudinally spaced guide rollers 227 which rotate in adjustable vertically spaced-apart upper and lower rail members 228 and 229, respectively. A rail support 230 provides vertical support and lateral adjustment for the rail members 228 and 229. The fixed belt 193 engages a second group of longitudinally spaced guide rollers 231 which rotate in a roller support 232.

In the illustrated structure the rail members 228 and 229 are installed in sections with each section having at least two of the guide rollers 227. Each of the rail members 228 and 229 are horizontal planar bars and each has a pair of horizontal circular recesses 233 in one edge 234 and a pair of horizontal threaded sockets 235 in the one edge 234. Vertical bores 236 in each rail member 228 and 229 are aligned in vertical pairs and adapted to receive a suitable bushing 237 therein for rotatably supporting one of the one group of guide rollers 227.

The rail support 230 has a pair of vertically spaced-apart flanges 238 and 239 upper and lower, respectively, which are aligned with the rail members 228 and 229, respectively. A plurality of horizontal circular recesses 240 in one edge 241 of each flange 238 and 239 are aligned with the recesses 233 in the respective rail members 228 and 229. A plurality of bores 242 extend horizontally through each of the flanges 238 and 239 and each bore 242 is aligned with a horizontal threaded socket 235 in the one edge 234 of the rail members 228 and 229.

Suitable resilient members, such as helical compression springs 243, are installed in the aligned recesses 233 and 240 and suitable adjustable fastening devices, such as bolts 244, are installed in the bores 242. Each bolt 244 has a head 245 on one end and threads 246 on the other end of a shank 247. The threads 246 engage the threaded sockets 235 when the shank 247 is installed in the respective bore 242.

The heads 245 engage an opposite edge 248 of the flanges 238 and 239 thereby limiting the lateral movement of the rail members 228 and 229. The springs 243 urge the respective rail members 228 and 229 away from the rail support 230 until the heads 245 engage the opposite edge 248.

The rail support 230 is adjustable laterally in response to operation of a handwheel 249. A suitable power transmission means connects the handwheel 249 with the rail support 230. In the illustrated structure a stub shaft 250 has a sprocket 251 intermediate its ends and the handwheel 249 is suitably secured on one end of the stub shaft 250. The other end of the stub shaft 250 is rotatably supported in an intermediate wall 254. An endless chain 255 engages the sprocket 251 and a sprocket 256 which is suitably secured on one end of an elongate adjustment shaft 257. The shaft 257 extends from the intermediate wall 254 to the wall or support 164. A bevel gear 258 is secured on the adjustment shaft 257 adjacent the intermediate wall 254 and a bevel gear 259 is secured on the adjustment shaft 247 adjacent the wall or support 164. A threaded stub shaft 260 is rotatably supported in a horizontal position on the intermediate wall 254, as by a bracket 261 having a suitable bearing therein. A bevel gear 263 is secured on one end of the stub shaft 260 and the bevel gear 263 engages the bevel gear 258. A threaded portion 265 of the stub shaft 260 engages an internally threaded sleeve 266 installed in a bracket 267 which is suitably secured on an upper cover plate 268. The upper cover plate 268 is suitably secured to the upper flange 238 of the rail support 230. The upper rail member 228 slidingly engages the upper cover plate 268. A threaded stub shaft 269 is similarly supported on the wall or support 164 and a bevel gear 270 is secured on the threaded shaft 269 and engages the bevel gear 259. A threaded portion of the threaded shaft 269 is similarly engaged in an internally threaded sleeve secured in a bracket 273 suitably secured to the upper cover plate 268.

Manually turning the handwheel 249 rotates the adjustment shaft 257 through the endless chain 255 and sprockets 251 and 256. The threaded stub shafts 260 and 269 thereby move the rail support 230 laterally through connection to the upper cover plate 268 and the connection of the bevel gears 263 and 270 with the bevel gears 258 and 259 respectively.

The rail support 230 is supported on special brackets 274 and 275 which are secured to the walls 254 and 164 respectively. A bracket ear 276 extends outwardly from facing surfaces of each wall 254 and 164 and the bracket ear 276 is substantially parallel with the beam 116. An elongate support rod 277 extends between each ear 276 and the beam 116 and is suitably secured to each ear 276 and the beam 116. A vertical support member 278 has one end suitably secured to a sleeve 280 which is installed on the support rod 277 and the other end suitably secured to a lower cover plate 282. The lower cover plate 282 is similar to the upper cover plate 268 and is suitably secured to the rail support 230. When the rail support 230 is adjusted laterally each support member 278 also moves laterally on the rod 277.

The roller support 232 is stationary and is suitably secured to the walls 254 and 164. In the illustrated structure the roller support 232 has a pair of vertically spaced apart flanges 283 and 284 upper and lower, respectively, with a vertical web 285 extending therebetween and suitably secured thereto. Vertical bores 286 in each of the flanges 283 and 284 are aligned in pairs and adapted to receive a suitable bushing or bearing 287 therein for rotatably supporting one of the second group of guide rollers 231.

The guide rollers 227 and 231 each have an elongate shaft 288 and a body portion 289 secured on the shaft 288 intermediate the ends thereof. The body portion 289 has a pair of vertically spaced apart wedge-shaped grooves 290 and 291 upper and lower, respectively, which are complementary in size and location to the endless wedge-shaped belts 191 and 192. The drive pulleys 194 and 197 and the idler pulleys 195 and 198 each have wedge-shaped grooves similar to grooves 290 and 291. The grooves 290 and 291 and the grooves in the drive and idler pulleys maintain the belts 193 and 196 in vertical alignment.

Tension is maintained in each of the belts 193 and 196 by an extension or center roller 292 and a pair of tensioning or alignment rollers 293 and 294 upstream and downstream, respectively. A pair of vertically spaced apart arms 295 support each center roller 292 and each of the tensioning rollers 293 and 294. A suitable adjustable fastening device, such as a bolt or screw 296, secures one end 297 of each of the arms 295 to the rail support 230 adjacent the opposite edge 248 of the rail support 230 or to the roller support 232. The bolts or screws 296 are loosened to permit the arms 295 to pivot about the bolts or screws 296 to the desired position. Another end 298 of the arms 295 has a center roller 292 or one of the tensioning rollers 293 and 292 suitably secured therebetween. Each center roller 292 has a face complementary to the interior face 190 of the belts 193 and 196. Each center roller 292 is installed between the tensioning rollers 293 and 294 and each center roller 292 engages one of the belts 193 or 196 and holds same outwardly from the rail support 230 or the roller support 232. The tensioning rollers 293 and 294 are installed on each side of the center roller 292 with the tensioning roller 293 upstream and the tensioning roller 294 downstream of the center roller 292. The tensioning rollers 293 and 294 each have smooth faces and each engage the exterior face 189 of the belts 193 or 196 and hold same inwardly adjacent the rail support 230 or adjacent the roller support 232 thereby adjusting the tension in the belts 193 or 196, respectively.

The tension thus induced in the belts 193 and 196 in cooperation with the guide rollers 227 and 231 holds the sets 6 pressed firmly together in clamping engagement. The belts 193 and 196 hold the sets 6 adjacent the bottom edge 7, and maintain the relative elevation of the bottom edge 7 of the sets 6 as received from the moving lugs 34 at the point of communication between the defined path 14 and the endless belts 5. The resilient mounting of the rail sections also assists in holding the sets 6 in clamping engagement to prevent creep vertically or horizontally of the interior sheets 3 with reference to the exterior sheets 10 and 11.

In the illustrated structure, tension is maintained in the tape 156 by the reel 157 and the applicator 159 being movable longitudinally of the machine 1. The reel 157 and the applicator 159 are each supported on legs 299 suitably secured to a pair of transverse support members 300. A sleeve 301 in each end of each support member 300 is mounted on one of a pair of elongate tubular members 302 extending between and suitably secured to the walls 254 and 164. A suitable fastening device such as a screw 303 is installed in the sleeve 301 in each end of one of the support members 300 for the reel 157 and for the applicator 159. The screws 303 are similar to the screws 143 and are each adapted to engage one of the tubular members, thereby securing the reel 157 and the applicator 159 in a selected longitudinal position.

It is to be understood that while I have illustrated and described one form of my invention, it is not to be limited to the specific form or arrangement of parts, or to the specific steps or sequence of steps herein described and shown except insofar as such limitations are included in the claims.

What I claim and desire to secure by Letters Patent is:
1. A tablet making machine including:
(a) an adjustable linear path having a first portion for receiving a plurality of registered sheets in sets, said path having guide members positioned to be engaged by said sets;
(b) an endless flexible member having a run adjacent said path, said flexible member having outwardly extending fingers for engaging said sets and moving same along said path first portion;
(c) conveying means including endless belts having adjacent opposed runs for receiving therebetween said sets of sheets from said first portion of the path;
(d) means resiliently urging one of said adjacent belt runs toward the other to clamp the sets of sheets therebetween;
(e) means driving said belts to move said adjacent runs and the sets of sheets clamped therebetween along a second portion of said path with a portion of said sets of sheets extending from between said belts and exposing one edge of each of said sets;
(f) a grinder supported along said path and operative to engage and grind said one edge of said moving sets in a plane substantially perpendicular to a plane defined by the clamped sets of sheets;
(g) an adhesive applicator supported along said path downstream of said grinder and operative to apply a coating of adhesive to said ground edge of the clamped set of sheets;
(h) adjustable tensioning means associated with said belts for maintaining selected tension therein and cooperating with the means urging the belts to clamping relation with the sets of sheets to maintain registry of the sheets as they are moved in said second portion of the path.

2. A tablet making machine as set forth in claim 1 including:
(a) said drive means moving said endless belts providing said movement in timed relation with said flexible member whereby the sets moving through the second portion of the path are closely spaced;
(b) a plurality of longitudinal projections associated with each of said endless belts, said projections being on a face opposite the face engaging said sets;
(c) said means urging the belt runs toward each other including a plurality of support means each having a plurality of closely spaced guide rollers therein, each guide roller having annular grooves complementary to said projections for receiving and supporting said longitudinal projections.

3. A tablet making machine as set forth in claim 1 wherein said conveying means includes:
(a) said endless belts each having a plurality of laterally spaced wedge-shaped portions on an interior face and extending longitudinally thereof;
(b) said drive means associated with each of said endless belts moving said belts in timed relation with said flexible member;
(c) idler means associated with each of said endless belts for guiding said belts;
(d) support means for each belt and having a plurality of longitudinally spaced rotatably mounted guide rollers with each being positioned to be engaged by said interior face and said wedge-shaped portions for longitudinally supporting same;
(e) said means urging one belt toward the other having a plurality of resiliently mounted adjustable rail sections for positioning said one belt whereby said belts hold said sets in clamping engagement, said guide rollers being mounted between said rail sections.

4. The tablet making machine as set forth in claim 3 wherein each of said resiliently mounted rail sections includes:
(a) a pair of vertically spaced apart rail members,
(b) a rail support positioned adjacent said rail members,
(c) adjustable fastening means associated with each of said rail members and with said rail support for adjusting the spacing between said pair of endless belts, and
(d) a plurality of longitudinally spaced resilient members positioned between each of said rail members and said rail support for urging said one belt toward the other of said pair of endless belts thereby clampingly engaging said sets of sheets between said pair of endless belts.

5. The tablet making machine as set forth in claim 3 wherein each of said longitudinally spaced guide rollers includes:
(a) an elongate rotatably supported shaft,
(b) an elongate body portion mounted on said shaft, and
(c) a plurality of longitudinally spaced annular grooves in said body portion, said grooves being complementary to said wedge-shaped belts for receiving and longitudinally supporting same.

6. The tablet making machine as set forth in claim 4 including:
(a) said pair of rail members each comprising a plurality of segments arranged in vertically spaced-apart pairs;

(b) said pairs of segments each receiving a plurality of adjustable fastening devices and a plurality of said resilient members and rotatably supporting a plurality of said longitudinally spaced guide rollers.

7. The tablet making machine as set forth in claim 1 including:

(a) a stripping applicator for applying stripping having adhesive on one face thereof to said one edge of said sets after the application of adhesive thereto by said adhesive applicator, said stripping applicator having means therein for folding opposite margins of said strip and wipers for pressing said strip into engagement with said one edge and pressing said folded margins into engagement with said opposite sides of said sets of sheets adjacent said one edge;

(b) a cutter operative to cut the stripping adjacent opposite ends of said one edge; and (c) said conveying means holding said sets of sheets substantially vertical with said one edge dowwardly disposed and positioned to engage said grinder and said adhesive applicator and said stripping applicator and said cutter respectively during said moving along said second portion of said defined path.

References Cited

UNITED STATES PATENTS

| | | | |
|---|---|---|---|
| 1,858,685 | 5/1932 | Semon | 281—21 |
| 1,931,244 | 10/1933 | Alger et al. | 11—1AD |
| 2,613,375 | 10/1952 | Smith, Jr. et al. | 11—1AD |
| 2,671,912 | 3/1954 | Stein et al. | 11—1AD |
| 2,697,236 | 12/1954 | McCain et al. | 11—1AD |
| 3,179,967 | 4/1965 | Yohn et al. | 11—1AD |
| 3,283,351 | 11/1966 | Müller | 11—1AD |

BENJAMIN R. PADGETT, Primary Examiner

B. H. HUNT, Assistant Examiner

U.S. Cl. X.R.

11—1; 156—522